Sept. 24, 1935.  M. LUTHER ET AL  2,015,347
PROCESS FOR TREATING LIQUIDS WITH GASES OR VAPORS AND APPARATUS THEREFOR
Filed Aug. 11, 1928
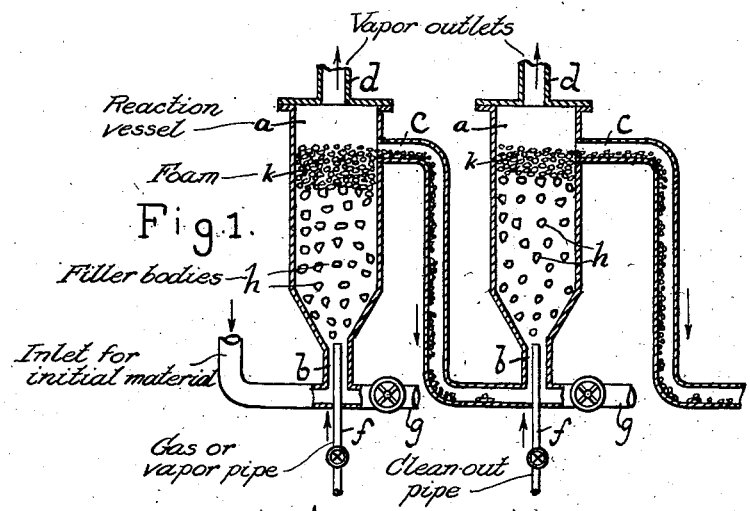
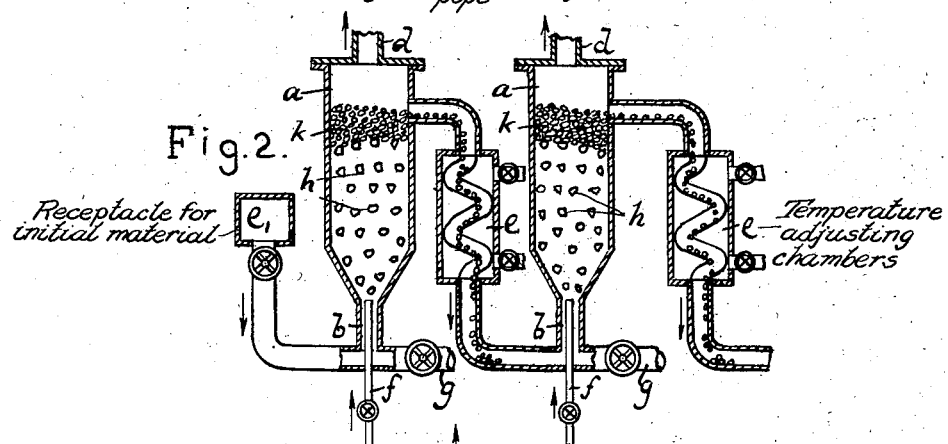
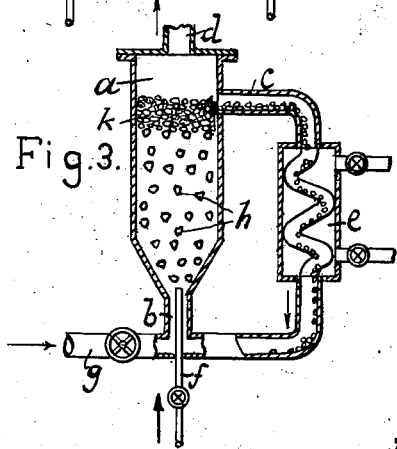
INVENTORS
Martin Luther
Karl Goetze
By  Hauffell Varland
ATTORNEYS Patented Sept. 24, 1935

2,015,347

UNITED STATES PATENT OFFICE 2,015,347

PROCESS FOR TREATING LIQUIDS WITH GASES OR VAPORS AND APPARATUS THEREFOR

Martin Luther and Karl Goetze, Mannheim, Germany, assignors to I. G. Farbenindustrie Aktiengesellschaft, Frankfort-on-the-Main, Germany, a corporation of Germany Application August 11, 1928, Serial No. 298,958
In Germany August 20, 1927

5 Claims. (Cl. 196—142)

The present invention relates to an improved process for treating liquids with gases or vapors and apparatus therefor.

In the German Patent No. 405,850 a process is described according to which hydrocarbons in liquid form are oxidized by a blast of oxidizing gases, the reaction vessel being provided with filling bodies, which may be inert or have catalytic effect and are disposed in such a manner that they project above the surface of the liquid as long as the liquid is at rest. On blowing in the blast of oxidizing gases very considerable foaming is set up which distributes the liquid all over the fillers.

We have now found that, generally speaking, liquids can be advantageously treated with gases or vapors, and that, particularly, organic liquids can be oxidized by means of air, by admitting the liquid, in conjunction with the gases or vapors, from below, into a reaction vessel provided with inert or catalytic fillers, the liquid then foaming in the interior of the said vessel and being led away in the upper part of the said vessel, for example through an overflow. The liquid may be passed either only once or several times in circulation through the vessel in this manner, until the reaction between the liquid and the gas or vapor has progressed to the desired extent. Instead of operating in a cycle, the liquid may be passed, with the gas or vapor, through several reaction vessels disposed in series, all the vessels being either maintained at the same temperature or different temperatures being employed in the different vessels. As a rule, it is preferable to separate the liquid from the gases after these have left the reaction space. The liquid may be treated with gas or vapor for a certain period in each or certain of the reaction vessels in the presence of fillers projecting above the surface of the liquid when the latter is at rest.

It is often advisable to interpose between the several reaction vessels, other vessels or arrangements which serve to control the temperature.

The process is suitable, for example, for the oxidation of oils, fats, waxes, or hydrocarbons in the liquid form, but it may also be applied in carrying out a great variety of other chemical reactions, such as chlorination with dilute chlorine, freeing fats and oils from acid by treatment with inert gases or vapors and other like processes.

In apparatus suitable, for example, for oxidizing paraffin wax with air according to the present process, the air current enters at the lower part of a reaction vessel of the apparatus and the paraffin wax is likewise fed in at the lower part of the said vessel, from the top of which vessel, after oxidation, it passes into the lower part of a second reaction vessel, and the air current issues at the upper part of each of the said vessels. If desired, an intermediate vessel may be provided which serves to receive the material to be further oxidized from the first mentioned reaction vessel, for the purpose, for example, of cooling or heating, and from which the material runs off into the second reaction vessel, or is drawn into the same if the current of air be strong enough. Also, if desired, the material, overflowing from the intermediate vessel, may be again drawn, after cooling, into the lower part of the reaction vessel in which it has been already treated, by the air current which enters at the lower part of the said vessel as aforesaid.

An apparatus suitable for carrying out the present invention is shown in the accompanying drawing but the invention is not limited to this special design.

In the Figures 1–3 there are shown in cross-section the reaction vessels $a$ provided with filler bodies $h$, at the bottom of which vessels is inserted an inlet $b$ for the material to be treated and a pipe $f$ through which the reacting gas or vapor is introduced. The reaction vessels $a$ are covered at the top, the gases or vapors being led away after the reaction through the pipe $d$. The overflow pipe $c$ allows the foam of the material treated to run off to the next reaction vessel or, as in the case of Figure 3, to run back to the bottom of the same reaction vessel and be treated again therein. The arrangements $e$ shown in Figures 2 and 3 can be employed either for cooling or for heating the material after each treatment, as required.

The pipes $g$ can be employed for clearing the reaction vessels and the vessel $e_1$ in Figure 2 serves as a receptacle for the initial material. In operation the initial material is sucked into the reaction vessel by the current of gases or vapors introduced at $f$ or it can be fed by hydrostatic or other pressure such as is shown in Figure 2, or the application of pressure can be dispensed with altogether, the resulting foam mounting gradually up to the overflow pipe $c$.

What we claim is:

1. Apparatus for treating liquids in the liquid phase with gases or vapors, comprising a series of vessels, filler bodies therein, means for admitting the liquid materials to the bottom of the first vessel, means for admitting gases or vapors to the bottom of each vessel of said series, means for withdrawing gases and vapors from the top of each vessel of said series, and means for conveying liquid material and foam from the upper part of each vessel immediately above the surface of said filler bodies to the bottom of the following vessel of said series, said conveying means being provided with means for adjusting the temperature of the material passing therethrough.

2. The process of oxidizing paraffin wax in the liquid phase, which comprises introducing liquid paraffin wax simultaneously with oxidizing gases at the bottom of a reaction vessel provided with filler bodies, thereby forming a foam from said liquid wax and said gases, leading off the resulting foam from immediately above the surface of the filler bodies, the material treated being then passed through at least one further reaction vessel of the same kind, while heating the material during its passage to a following vessel.

3. The process of oxidizing paraffin wax in the liquid phase, which comprises introducing liquid paraffin wax simultaneously with oxidizing gases at the bottom of a reaction vessel provided with filler bodies, thereby forming a foam from said liquid wax and said gases, leading off the resulting foam from immediately above the surface of the filler bodies, the treated material then being passed on to at least one further reaction vessel of the same kind, through a structure interposed between the several reaction vessels, and in which structure the temperature of the material is regulated so as to suit the reaction conditions desired in the following vessel.

4. The process of oxidizing organic compounds selected from the group consisting of oils, fats, waxes and hydrocarbons in the liquid phase, which comprises introducing the said liquid initial material together with an oxidizing gas at the bottom of a first reaction vessel provided with a substantial mass of filler bodies, thereby forming a foam from said liquid material and said oxidizing gas, lifting the resulting foam by means of said oxidizing gas, leading it off near the top of the said vessel to the bottom of at least one further reaction vessel of the aforesaid kind, through a structure interposed between the several reaction vessels, and in which structure the temperature of the treated material is adjusted to the reaction conditions desired in the following vessel, the reaction being carried on in the said further reaction vessel or vessels in substantially the same manner as in the said first reaction vessel.

5. An apparatus for oxidizing in the liquid phase organic substances selected from the group consisting of oils, fats, waxes and hydrocarbons, comprising a plurality of similar reaction vessels which contain filler bodies and at the upper part means for leading off gases and which reaction vessels are connected with one another in series by means suitable for conveying liquid material and foam from the upper part of one vessel immediately above the surface of said filler bodies to the lower part of the following vessel, said conveying means being provided with means for adjusting the temperature of the material passing therethrough, all the vessels being provided with means for admitting the liquid and gaseous reaction materials in conjunction with one another to the bottom part of said vessels and the last of the said vessels being provided with means for withdrawing the liquid materials.

MARTIN LUTHER.
KARL GOETZE.